United States Patent [19]

Arp

[11] Patent Number: 4,993,582
[45] Date of Patent: Feb. 19, 1991

[54] GUSSETED DOUBLE-WALLED BOX FORMED OF DRAPED AND BLOW MOLDED PARISON

[75] Inventor: George F. Arp, Rochester, N.Y.

[73] Assignee: John D. Brush & Co., Inc., Rochester, N.Y.

[21] Appl. No.: 437,450

[22] Filed: Nov. 15, 1989

Related U.S. Application Data

[62] Division of Ser. No. 289,318, Dec. 23, 1988, Pat. No. 4,898,707.

[51] Int. Cl.$^5$ .............................................. B65D 1/40
[52] U.S. Cl. .................................................... 220/469
[58] Field of Search ......................................... 220/469

[56] References Cited

U.S. PATENT DOCUMENTS

| | | | |
|---|---|---|---|
| 2,720,680 | 10/1955 | Gerow | 264/563 |
| 3,437,423 | 4/1969 | Mondiabis | 220/469 |
| 3,441,071 | 4/1969 | Schurman | 220/469 |
| 3,663,522 | 5/1972 | Butcher | 264/296 X |
| 3,746,204 | 7/1973 | Nagai | 220/469 |
| 3,821,343 | 6/1974 | Sudo | 264/237 X |
| 3,897,530 | 7/1975 | Leathers | 264/285 X |
| 4,770,839 | 9/1988 | Legge | 264/526 |
| 4,828,786 | 5/1989 | Legg et al. | 264/515 |

FOREIGN PATENT DOCUMENTS 203022  11/1983  Japan .

Primary Examiner—George E. Lowrance
Attorney, Agent, or Firm—Eugene Stephens & Associates

[57] ABSTRACT

A gusseted double-walled box is formed of a parison that is draped and blow molded according to the following process. A blow molding parison (10) being draped around a generally rectangular mold part (12) is spread from its extruded cylindrical shape into a generally rectangular shape (14), as it descends from an extrusion head (11). Before the open bottom (20) of the parison reaches a clamp (25) on the mold part, a jet of air is blown downward through the open bottom to draw in the parison's side and end regions (21 and 22 respectively). This reduces the size of parison (10) and helps it fit within the clamp and also forms the end regions (22) of the parison into a pair of opposed pleats (23) extending inward from the ends of the pinch-off line when clamp (25) closes. Further descending of the parison unfolds the pleats into gussets (24) extending toward corner regions (27) of mold part (12) so that the parison can drape around the mold part corners. The resulting box has gussets formed on an internal wall to extend from the pinch-off line, as can be seen by cutting away the box bottom.

6 Claims, 3 Drawing Sheets

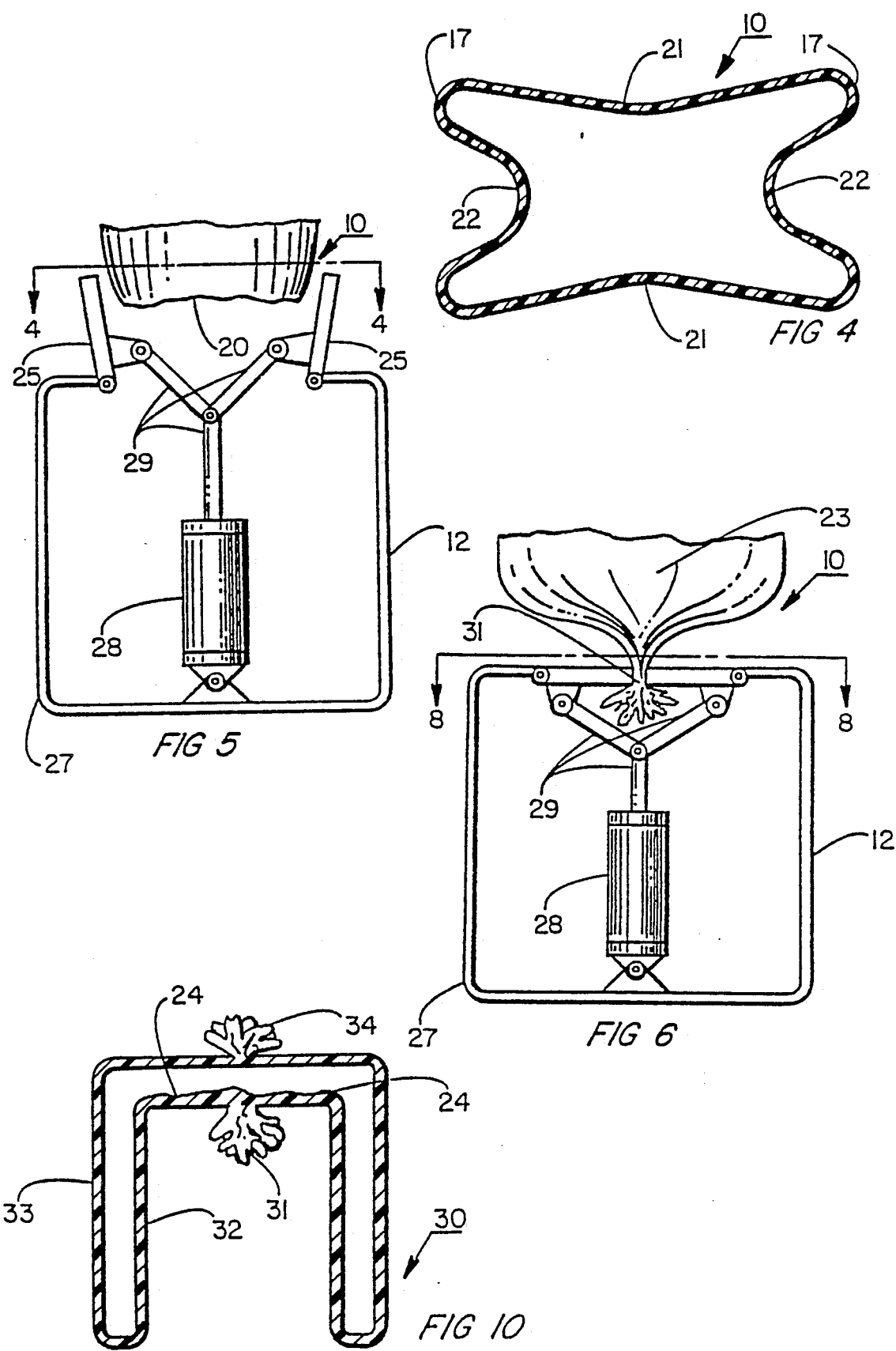

GUSSETED DOUBLE-WALLED BOX FORMED OF DRAPED AND BLOW MOLDED PARISON

RELATED APPLICATIONS

This application is a division of allowed parent application Ser. No. 289,318, filed Dec. 23, 1988, entitled METHOD AND APPARATUS FOR GUSSETED PARISON DRAPING, now U.S. Pat. No. 4,898,707, issued Feb. 6, 1990.

BACKGROUND

In draping a parison into a double-walled box or container, a lower region of the parison is clamped closed and held in place while the parison is draped over or into a mold part, with the parison sometimes being ballooned in the draping process. Preferred ways of doing this are shown in copending and commonly assigned patent applications Ser. No. 868,294, filed May 28, 1986, entitled DRAPED PARISON BLOW MOLDING now U.S. Pat. No. 4,828,786, issued May 9, 1989; Ser. No. 895,329, filed Aug. 11, 1986, entitled CORE PINCH-OFF FOR BLOW MOLDING PARISON; and Ser. No. 945,020, filed Dec. 22, 1986, entitled REVERSE PARISON DRAPING FOR BLOW MOLDING, now U.S. Pat. No. 4,770,839, issued Sept. 13, 1988.

Draping a parison around a rectangular-shaped mold part poses special problems. The preferred shape for the original parison is cylindrical, and forming a cylindrical parison to spread outward and drape over corners of a rectangular mold part requires either making the initial parison relatively large in diameter or carefully stretching a smaller parison outward into a rectangular form. In turn, enlarging or stretching the parison creates the problem of a longer linear length of clamp being required to flatten the bottom of the parison along a clamp line. It is even possible, and undesirable, for the clamp line to be longer than the long axis of the rectangular shape over which the parison is being draped. It is also possible to collapse an open bottom of a parison by blowing air downward through it, and out the open bottom, so that the parison fits within a smaller clamp opening; but I have found that a cylindrical parison collapses irregularly in response to an air jet so that the parison collapse is not repeatable and cannot produce uniform and predictable results.

SUMMARY OF THE INVENTION

I have discovered that by preforming a cylindrical parison to approximately the desired rectangular shape of the mold, an air jet through the open bottom of the parison has the predictable and repeatable effect of drawing the side and end walls of the parison inward from the corner regions; and this can be used for reliably pleating the parison at the clamp line. Then, as the parison continues to descend, gussets unfold from the pleats and extend to the corner regions of the mold. In this way, my improvement repeatably controls the pleating and gusseting of a parison being draped around a generally rectangular-shaped mold part. It includes a spreader arranged below a circular head that extrudes the parison, and the spreader is positioned inside the parison and disposed to spread the parison outward at corner regions of a generally rectangular shape as the parison lowers from the extruding head. As an open bottom of the spread parison lowers into proximity with an open mold clamp oriented along the length of the rectangular shape, a jet of air blows downward through the open bottom of the parison to draw side and end regions of the open bottom inward relative to the corner regions of the parison. This makes the open bottom of the parison small enough to lower into the open clamp; and when the clamp is closed, end regions of the parison are folded into pleats as the parison is flattened along the clamp line. As the parison descends further, the pleats unfold into gussets extending toward corners of the mold part; and these help the parison reach the mold corners and drape an adequately thick resin layer around the mold corners.

The spreaders that spread the lowering parison into a generally rectangular shape can be movable to retract when not in use, and shoulder regions of the spreaders can direct air jets against the inside of the parison to help the parison stretch and lower over the shoulder regions of the spreaders. Also, the parison can be ballooned as it is draped around the mold part. A double-walled box made this way has opposed pleats extending inward from the ends of a pinch-off line running along a long axis of a rectangular bottom region of the box, and gussets that unfold from the pleats toward corner regions of the box, the gussets appearing in an interwall region of the box bottom.

DRAWINGS

FIG. 1 is a partially schematic and partially cut away elevational view of a parison being lowered for gusseting according to my invention.

FIGS. 2–4 are cross-sectional views of the parison of FIG. 1, taken respectively along the lines 2—2, 3—3, and 4—4 thereof.

FIGS. 5–7 are partially schematic, partially cross-sectional views of the lower region of the parison of FIG. 1 lowering into an open clamp on a mold core (FIG. 5), being pleated and clamped at the top of the mold core (FIG. 6), and being gusseted and draped over the top of the mold core (FIG. 7).

FIG. 10 is a cross-sectional view of a double-walled box blow molded by gusseting a parison according to my invention, shown upside down as molded and with untrimmed pinch-off regions.

DETAILED DESCRIPTION

Figures 1, 2, 3:
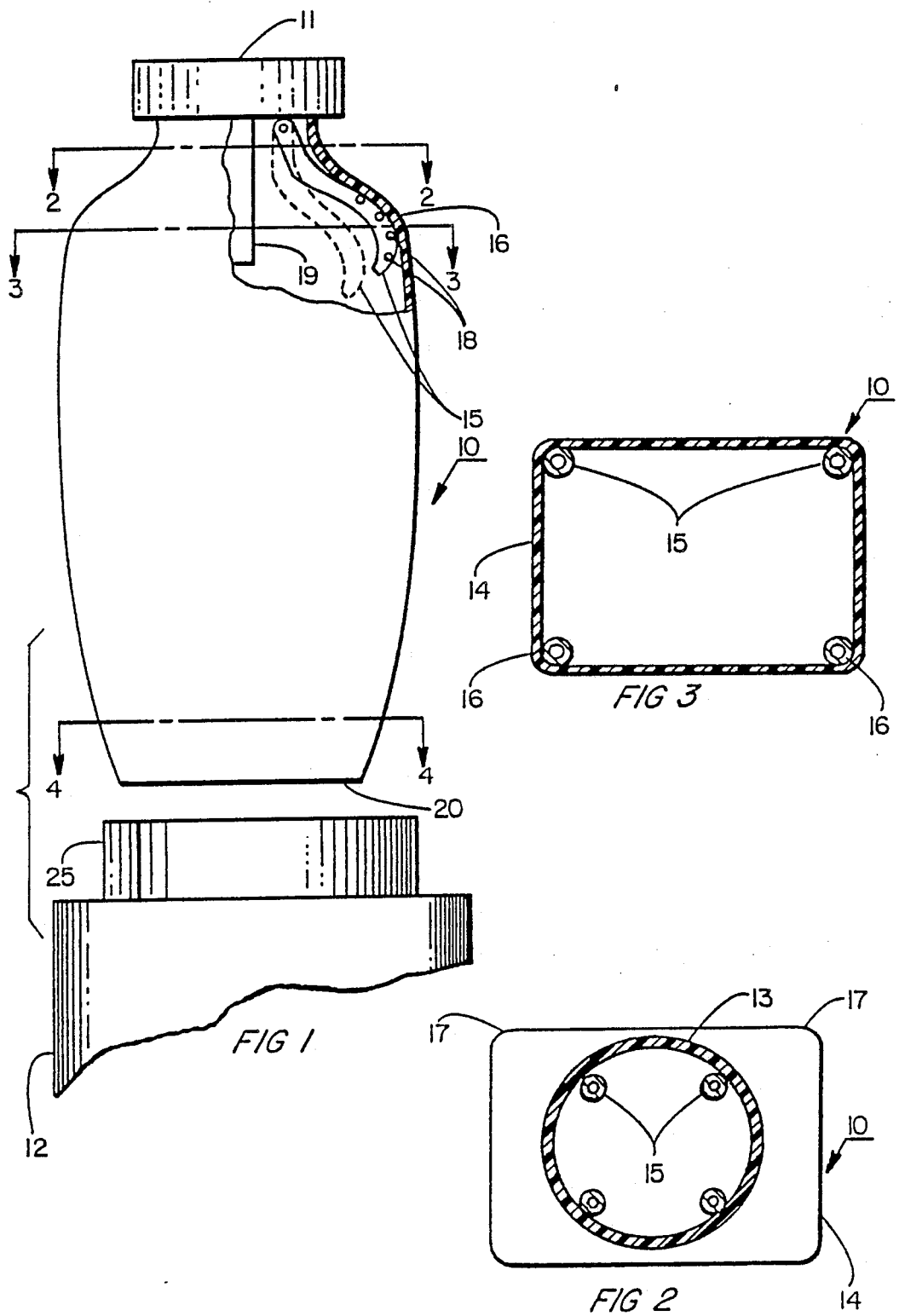

A parison draped around a generally rectangular mold part according to my invention is first preformed into a generally rectangular, cross-sectional shape, as it descends from a circular extruding head. An open bottom of the parison is then reduced in size by infolding so that the parison forms a pair of opposed pleats as it is clamped on the mold part. As the parison continues to descend and drape around the mold part, these pleats unfold into gussets extending toward the corner regions of the mold part. The beginning of this process is shown in FIG. 1, where a parison 10 is extruded to descend from a head 11 toward a generally rectangular mold part 12, which for purposes of illustration, is a core for a double-walled box. The preferred shape for parison 10 is cylindrical as it descends from head 11; and although it is possible to extrude parisons in non-circular cross-sectional shapes, this is more expensive and troublesome than extruding a cylindrical parison. Head 11 is preferably controllable to adjust the thickness of the resin material in parison 10, as it descends from head 11, so that parison 10 can be made thicker in regions where it will be stretched farther. The original circular cross-sectional shape of parison 10 is shown at the cross section plane of FIG. 2.

Underneath head 11 is a spreader 15, arranged inside of parison 10. The purpose of spreader 15 is to stretch the original cylindrical shape of parison 10 into a generally rectangular shape 14, as shown in FIGS. 2 and 3. There are many ways that spreader 15 can be configured to accomplish this; and the preferred shape shown for spreader 15 includes four arms, each having a curved shoulder 16 over which parison 10 slides, as it descends. With a spreader arm 15 disposing a shoulder 16 at each corner 17 of rectangular shape 14, parison 10 is stretched, spread, and formed into generally rectangular, cross-sectional shape 14, as it descends over spreader arms 15. To help parison 10 slide over spreaders 15, air can be injected into corner regions 17 through holes 18 in spreader shoulders 16. It is also possible to pivot spreader arms 15 to move out of corner regions 17, as shown in broken lines in FIG. 1, when spreader arms 15 are not in operation. Spreader shoulders not formed on separate spreader arms are also possible, and spreader shoulders can be made movable in various ways.

Figure 8:
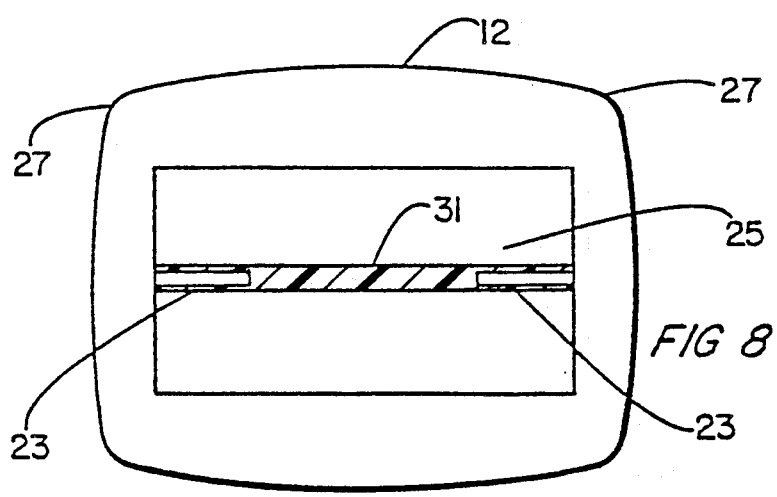
FIG. 8 is a cross-sectional view of the pleated and clamped parison of FIG. 6, taken along the line 8—8 thereof.

Once spread into rectangular shape 14 by spreader arms 15, parison 10 maintains this generally rectangular shape 14 as it descends below spreader shoulders 16. As an open lower region 20 of parison 10 approaches an open clamp 25 on mold part 12, an air jet is blown downward through the inside of parison 10 and out through open bottom region 20. This draws the sides of parison 10 inward relative to corner regions 17, as shown in FIG. 4, to reduce the size of parison 10 and help it fit within clamp 25. The drawing in of sides 21 and ends 22 of parison 10 not only reduces the overall size of bottom region 20, but also folds end walls 22 inward so that these form opposed pleats 23, as shown in FIGS. 6 and 8, when clamp 25 closes. Pleats 23 extend inward from the ends of the clamp line of the leading pinch-off region and significantly shorten the length of this clamp line along the length of clamp 25. This allows parison 10 to be stretched into rectangular shape 14 in a size large enough to be draped comfortably over corners 27 of mold part 12, and still have a pinch-off line that is reasonably short so it can fit within the space available in clamp 25.

The air jet blown downward through parison 10 to fold end walls 22 inward can be delivered from blow pin 19, or from an air nozzle aimed downward from head 11. The height of an air nozzle is not critical, so long as the downward blast of air through the open bottom 20 of parison 10 is adequate to draw side walls 21 and end walls 22 inward, as shown in FIG. 4.

The jaws of clamp 25 extend along the long axis of rectangular shape 14 and are preferably made as long and as wide opening as possible, within the limits of mold part 12. The jaws of clamp 25 can be opened and closed with a variety of mechanisms, and the cylinder 28 and linkage 29 that are schematically shown in FIGS. 5-7 illustrate one of several possibilities.

Figure 7:
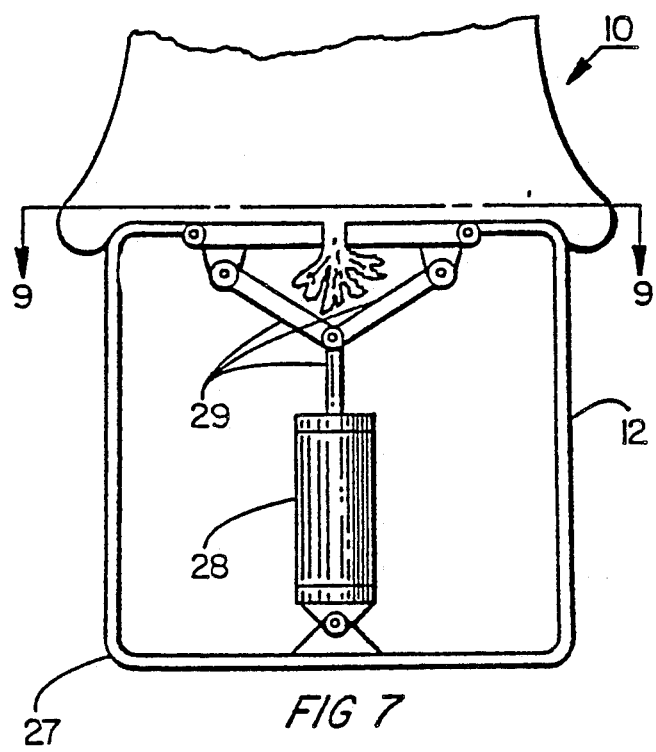

After parison bottom 20 is clamped to form pleats 23, parison 10 continues to descend; and with the possible assistance of ballooning parison 10, preferably by air injected from blow pin 19, parison 10 drapes downward over core 12, as shown in FIG. 7. As this occurs, pleats 23 unfold into gussets 24 extending outward toward corners 27 of core 12. The unfolding of gussets 24 restores parison 10 to its generally rectangular shape so that it can drape successfully over corners 27, without being stretched too thin. The configuration of gussets 24, as parison 10 unfolds and drapes, resembles the bottom of a paper grocery bag.

Figure 9:
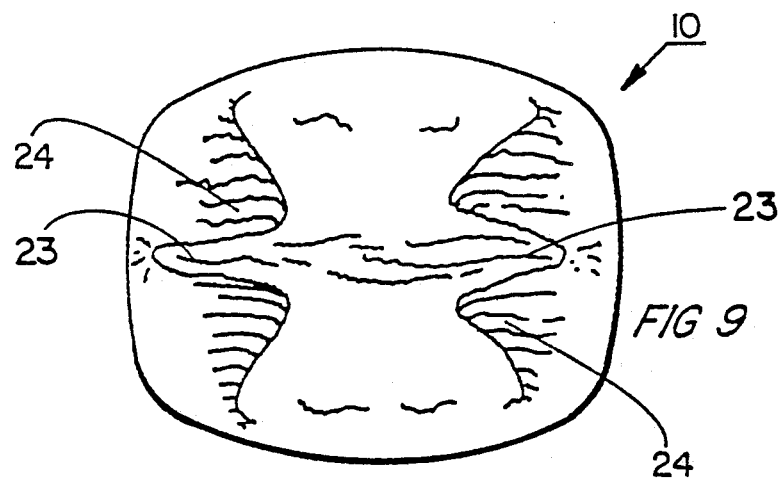
FIG. 9 is a cross-sectional view of the gusseted parison of FIG. 7, taken along the line 9—9 thereof.

Since parison 10 is eventually blown against the surface of core 12, gussets 24, as shown in FIG. 9, appear on the opposite side of the resin face that confronts the upper surface of core 12. This disposes gussets 24 within the interwall space of a double-walled box 30, as shown in FIG. 10. Leading pinch-off region 31 occurs in the inside wall at the bottom of box 30, which is shown upside down, as molded, and before trimming, in FIG. 10. Gussets 24 that unfold from pleats along leading pinch-off region 31 appear between inner wall 32 and outer wall 33, at the bottom of box 30. A trailing pinch-off 34 appears in outer wall 33 at the bottom of box 30, opposite leading pinch-off 31. The resin wall distance between the leading and trailing pinch-off regions can exceed eight feet, throughout which inner wall 32 and outer wall 33 are typically only an inch or two apart. The weight of resin material in box 30, after trimming of pinch-off regions 31 and 34, can exceed 20 pounds.

Pleating and gusseting parison 10 can also be used for reverse parison draping, in which a leading region of a parison is clamped and draped first into a cavity, and a trailing region of the parison is pinched off by a core, which is then brought within the cavity, as explained in U.S. Pat. No. 4,770,839. For boxes having a generally rectangular cross-sectional shape, parison 10 is spread into a corresponding rectangular shape, and pleated as it is clamped, so that gussets unfold to help the parison reach corner regions of a cavity. This disposes the unfolded gussets 24 on the inward facing surface of the outside bottom wall of the resulting box, rather than on the inner wall, as shown in FIG. 10.

I claim:

1. A double-walled box having a generally rectangular bottom region with a long axis substantially longer than a short axis, said box being formed of a single resin parison that is draped and blow molded, and said box comprising:
   a. resin material of a wall of said box in said bottom region of said box being formed into a leading pinch-off region extending centrally along the length of said long axis of said rectangular bottom region;
   b. said resin material being folded into an opposed pair of pleats extending inward from opposite ends of said pinch-off region; and
   c. gussets unfolded from said pleats to extend toward corner regions of said bottom region, said gussets appearing on an interwall surface of said box wall forming said leading pinch-off region at said bottom region of said box.

2. The box of claim 1 wherein said gussets are formed in an inner wall of said box.

3. A double-walled box formed by the method of draping a generally cylindrical parison around a generally rectangular mold core arranged within a generally rectangular mold cavity as said parison lowers from an extrusion head, so that said parison can be blown against surfaces of said cavity and said core, said draping method comprising:

a. preforming said parison into a generally rectangular shape having opposed side and end walls, said preforming being accomplished by passing said parison over a spreader arranged under and proximate to said extrusion head to form said parison internally into corner regions of said generally rectangular shape as said parison descends from said extrusion head;

b. as an open bottom end of said generally rectangular parison descends into proximity with an open mold clamp arranged on said rectangular mold core, directing a jet of air downwardly through said open bottom end to draw said side and end walls of said generally rectangular parison inward relative to said corner regions in a bottom region of said parison;

c. clamping said inwardly drawn side and end walls of said bottom region of said parison by closing said clamp against said bottom region of said parison to form a pleat in each of said end walls as said bottom region is folded to extend along said clamp;

d. further lowering said clamped parison so that said parison drapes around said rectangular core mold and said pleats unfold into gussets and extend toward corners of said rectangular mold core; and e. closing said cavity and blowing said parison against said core and said cavity.

4. The box of claim 3 wherein said gussets are formed in an inner wall of said box.

5. A double-walled box having inner and outer walls spaced from each other throughout side regions and a bottom region of said box, said bottom region being generally rectangular with a long axis substantially longer than a short axis, and said box comprising:

a. resin material forming one of said walls in said bottom region of said box having a leading pinch-off region arranged to extend along said long axis of said bottom region;

b. said resin material along said pinch-off region being arranged in inwardly folded end pleats;

c. said resin material extending from said pleats in gussets that unfold toward corner regions of said bottom region; and d. said gussets being formed on an interwall side of the wall forming said leading pinch-off region at said bottom region of said box.

6. The box of claim 5 wherein said gussets are formed in an inner wall of said box.

* * * * *